United States Patent [19]

Zoeke

[11] 4,230,409

[45] Oct. 28, 1980

[54] DEVICE FOR ADJUSTING THE POSITION OF A LENS IN TWO DIRECTIONS

[75] Inventor: Siegfried Zoeke, Munich, Fed. Rep. of Germany

[73] Assignee: Siemens Aktiengesellschaft, Berlin & Munich, Fed. Rep. of Germany

[21] Appl. No.: 54,581

[22] Filed: Jul. 3, 1979

[30] Foreign Application Priority Data

Aug. 4, 1978 [DE] Fed. Rep. of Germany ....... 2834334

[51] Int. Cl.³ ..................... G03B 27/52; G03B 23/00
[52] U.S. Cl. ........................................ 355/55; 354/10
[58] Field of Search ................. 355/55, 58; 354/9, 10

[56] References Cited

U.S. PATENT DOCUMENTS

| 2,084,450 | 6/1937 | Paris | 355/55 X |
| 2,572,322 | 10/1951 | De Goeij | 354/10 |
| 3,675,560 | 7/1972 | Moyround | 354/10 |
| 4,099,866 | 7/1978 | Jones et al. | 355/58 |

Primary Examiner—Donald A. Griffin
Attorney, Agent, or Firm—Hill, Van Santen, Steadman, Chiara & Simpson

[57] ABSTRACT

A device is disclosed for adjusting the position of a lens in two directions. The position of a lens with respect to an image plane is adjusted in two directions by fastening the lens to one end of a rod. The rod is axially movably and rotatably seated in a pipe which is fastened to a housing. At the other end of the rod, a lever is pivotably arranged. An end of the lever abuts against a support. The lever can be influenced by means of an adjustment mechanism such that the rod is movable in an axial direction and in a rotary direction.

11 Claims, 5 Drawing Figures

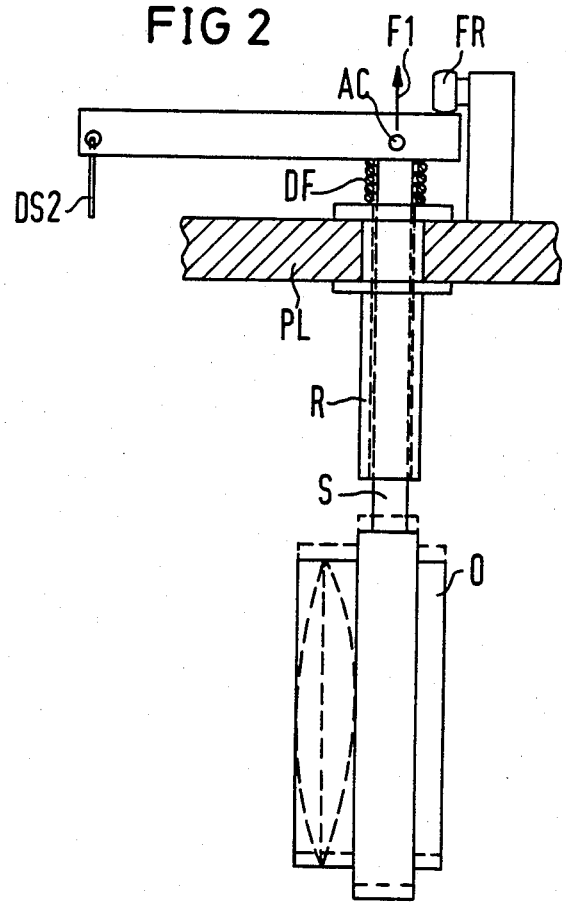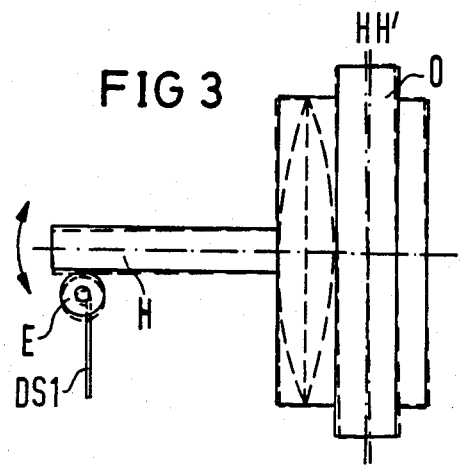

DEVICE FOR ADJUSTING THE POSITION OF A LENS IN TWO DIRECTIONS

BACKGROUND OF THE INVENTION

The invention relates to a device for adjusting the position of a lens in two directions, and particularly for adjusting the lens in a printing device of a non-mechanical printing or copying device.

The adjustment of the position of a lens in two directions is required, for example, in the forms printing device of a non-mechanical printer. Such a forms printing device, for example, is constructed as follows:

A negative of the form to be printed is arranged on a transparent drum. A light source is arranged in the interior of the transparent drum, by means of which the negative of the form is illuminated. The light proceeding from the negative is conducted via a lens to the surface of a photo conductor drum. There, previously charged areas of the photo conductor drum are again discharged in correspondence to the intensity of the incident light. The charge images are then developed in a normal manner, the toner images thereby arising are transferred onto paper, and, finally, fixed.

In the printing device, a character generator, with whose help charge images of characters to be printed are generated on the surface of the photo conductor drum, can be employed in addition to the forms printing device. Such a character generator, for example, can consist of a laser, an audio-optical deflection cell, and a polygonal mirror. The charge images generated by this character generator on the photo conductor drum are treated further in the manner described above. In order to arrange the forms to be printed on paper in the proper manner on the paper and also to obtain the proper allocation to the characters generated by the character generators, it is necessary to make the image of the form generated by means of the forms printing device adjustable in the line and column direction. To that end, the lens arranged in the beam path of the forms printing device can be employed in a simple manner.

SUMMARY OF THE INVENTION

It is an object of the invention to provide a device by means of which the position of a lens can be adjusted in two directions. Therefore, the adjustment in the two directions may occur in the millimeter range. This object is achieved in that the lens is fastened at one end of a rod which is adjustably and rotatably seated in a pipe arranged at a plate of a housing. A lever is rotatably arranged at the other end of the rod. One end of the lever rests against a support and at the other end a device is provided which influences the lever in such manner that the rod is movable in an axial direction and in a rotary direction.

A simple construction of the support consists in a roller which is permanently arranged on the housing. The lever can then support itself on the roller when the rod is moved in the axial direction.

In order to hold the lever or, respectively, the rod at a specific position without the influence of the device, it is expedient to arrange a compression spring on the rod between the pipe and the lever. With the assistance of the compression spring, a spring force can be exerted both in the axial direction of the rod as well as in the rotary direction.

The generation of the rotary motion of the rod can be achieved in a simple manner in that a rotatable shaft is provided on which an eccentric roller is arranged. The other end of the lever then rests on the eccentric roller. The spring provides a turning force which is applied so as to bias the end of the lever onto the eccentric roller. When the shaft and, thus, the eccentric roller is turned, then the lever and, thus, the rod executes a rotary motion.

The motion of the lever for adjusting the rod in the axial direction or, respectively, rotary direction can be generated with the assistance of a cable, whereby the cable for the axial motion acts upon the other end of the lever and the cable for the rotary motion acts upon the shaft with the eccentric roller. Expediently, the other ends of the cables are respectively connected with an adjustment lever. By means of moving the adjustment lever, the motion in the axial or, respectively, rotary direction of the rod can then be provided.

In order to achieve a compact construction of the adjustment levers with respect to one another, it is expedient to arrange the first adjustment lever on a hollow axis at whose other end a roller lies to which the first cable leads and to seat a further axle in the hollow axle at whose one end the second adjustment lever and at whose other end a second roller for the second cable is arranged. By so doing, it is possible to arrange the adjustment levers directly next to one another. In such an arrangement, there is also the possibility of employing the adjustment levers as indicators adjacent a scale.

The advantages of the inventive device are that the lens can be adjusted in the line and column directions in the millimeter range. Accordingly, the servicing elements for the lens can be arranged in a position which is favorable for observation. The adjustment of the lens may occur at any time. Finally, the device is very simply constructed.

BRIEF DESCRIPTION OF THE DRAWINGS

FIG. 2 is a top view of the invention;

FIG. 3 is a front view of the invention;

DESCRIPTION OF THE PREFERRED EMBODIMENT

Figure 1:
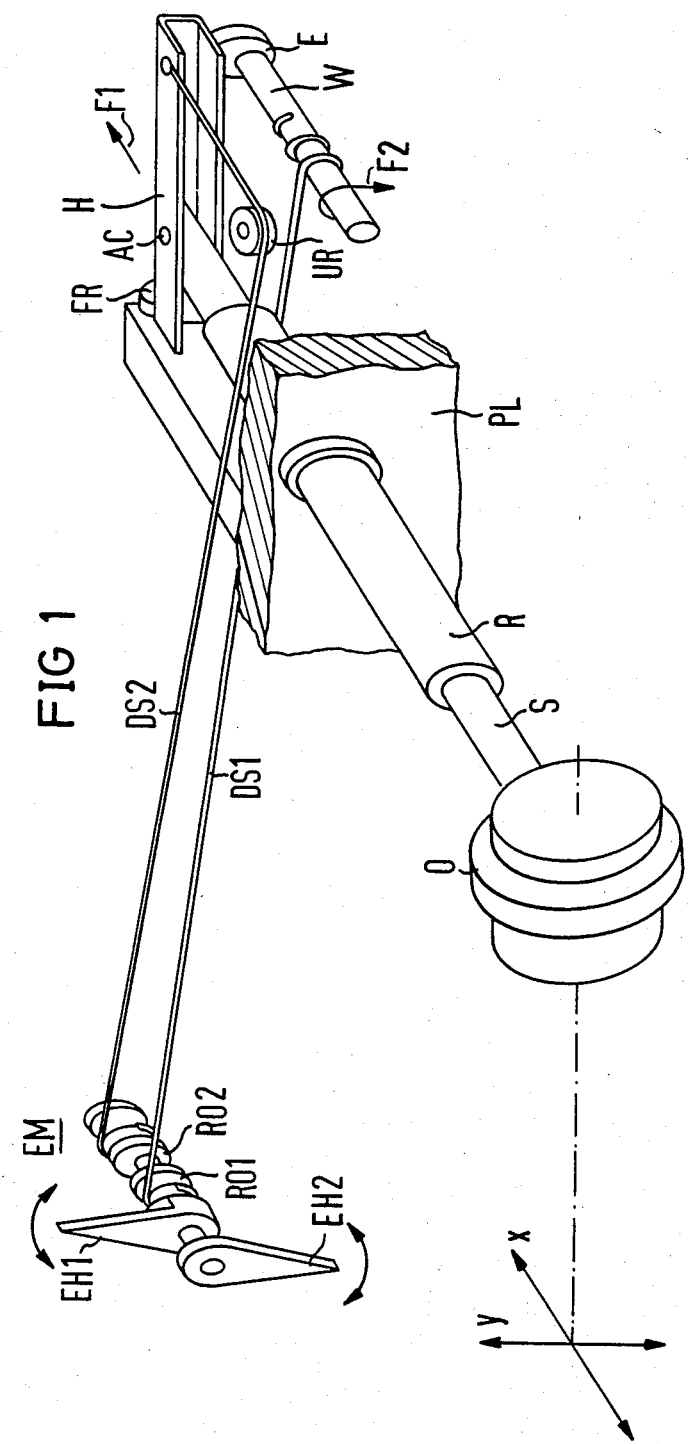
FIG. 1 is a perspective view of the device of the invention.

As FIG. 1 shows, the position of a lens O, for example, a mirror lens, is to be adjustable in two directions.

For this reason, the lens O is attached to a rod S. This rod S is adjustably and rotatably seated in a pipe. The pipe R is fastened to a plate PL of a housing of, for example, the forms printing device. The rod S is positioned in the pipe R. A lever H is rotatably arranged at its other end. Therefore, the rotational axis AC of the lever H passes through the rod S.

The one end of the lever H lies against a support which is designed as a fixed roller FR in the sample embodiment. The other end of the lever rests on an eccentric roller E which is fastened on a shaft W (FIG. 3). At the other end of the lever H, a cable DS2, for example, a wire cable, which leads to an adjustment mechanism EM, is also attached. A further cable DS1 which likewise leads to the adjustment mechanism EM is wound around the shaft W. Changes in the direction of the cables, for example of cable DS2, are carried out with the assistance of deflection rollers UR.

Figure 4:
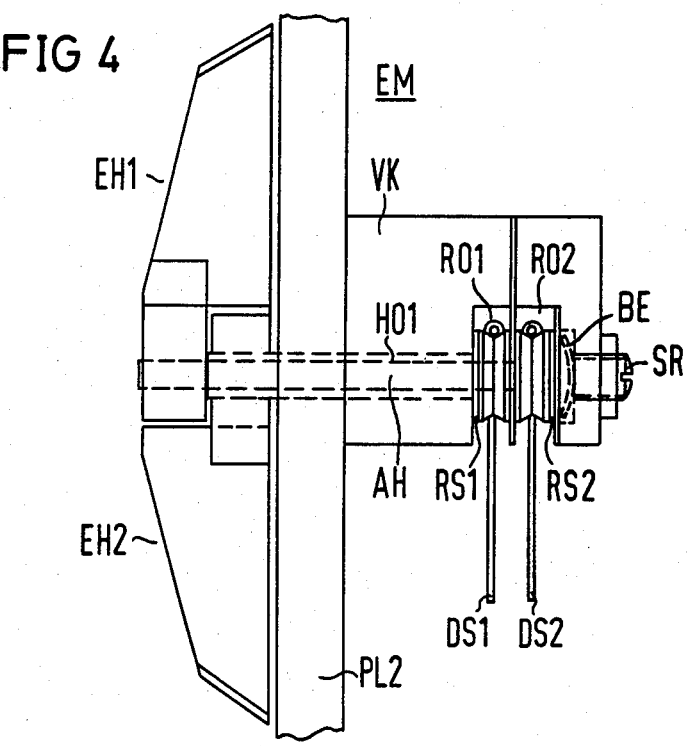
FIG. 4 illustrates the construction of the adjustment mechanism.

The adjustment mechanism EM, whose more detailed construction can be derived from FIG. 4, contains a first roller RO1 for the first cable DS1 and a second roller RO2 for the second cable DS2 onto which the cables can be wound. The rollers RO1 or, respectively, RO2 are respectively connected with the adjustment levers EH1 or, respectively, EH2.

In order to react to the adjustment of the lever H, or, respectively, the rod S through the assistance of the cables DS2 and DS1, a compression spring DF (FIG. 2) is provided which is arranged on the rod S between the pipe R and the lever H. With the assistance of this compression spring DF, a spring force can be exerted both in the direction of the arrow F1 as well as in the direction of the arrow F2.

FIG. 2 shows a detail of the device of FIG. 1. A lens O which is fastened on the rod S can be seen. The rod S is positioned through the pipe R which is fastened to the plate PL. It can be seen that the rod S leads to the lever H which is rotatable around the axle AC. Further, the position of the compression spring DF can be seen. The one end of the lever H is supported on a roller FR which is permanently fixed to the plate PL.

The more detailed construction of the adjustment mechanism EM can be derived from FIG. 4. The first adjustment lever EH1 is fastened on a hollow axle HO1 on whose other end the roller RO1 is arranged. The cable DS1 is wound up on the roller RS1. A further axle AH is rotatably arranged in the hollow axle HO1. The adjustment lever EH is at the one end of this further axle AH, whereas the roller RO2 for the cable DS2 is fastened at its other end. Therefore, the hollow axle HO1 is seated in a plate PL2. In order to hold the rollers RO1 and RO2 in any desired position, friction spring discs RS1 and RS2 are provided. Accordingly, the friction spring disc RS1 lies between a casing VK and the roller RO1, and the friction spring disc RS2 lies between the casing VK and the roller RO2. In order to generate the necessary friction forces, a bent disc BE can be pressed against the friction spring disc RS2 by means of a screw SR.

Figure 5:
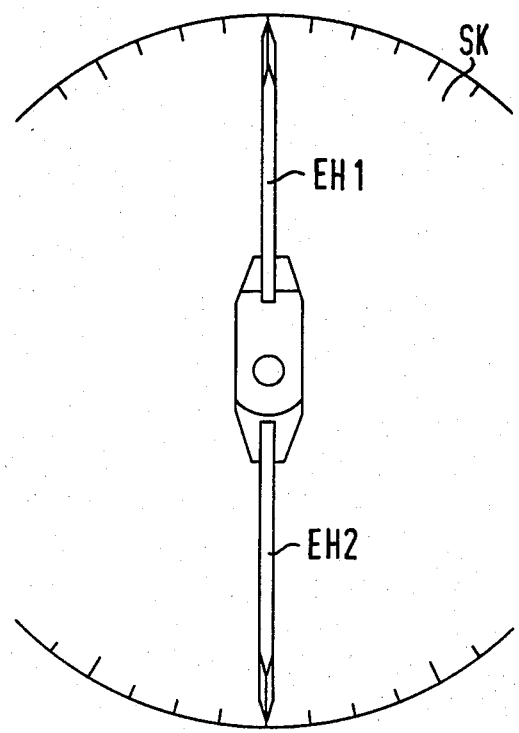
FIG. 5 shows the employment of the adjustment levers as indicators adjacent a scale.

In such a compact and neighboring arrangement of the adjustment levers EH1 and EH2, it is possible to employ these as indicators of a scale. This embodiment is illustrated in FIG. 5. It is thereby possible to perceive the position of the lens O by the position of the adjustment levers EH1 and EH2 on the scale. Therewith, the adjustment of the lens can be reproduced at any given time.

In the following, the function of the device is to be explained.

If the lens O is to be adjusted in the one direction, then the adjustment lever EH1 is turned in a corresponding manner. Therewith, the shaft W and, thus, the eccentric E is turned via the cable DS1. Since the lever H is subject to the spring force DF and rests against the eccentric E, the lever H likewise carries out a motion by means of which the rod S is turned. The rotation of the rod S affects the lens O in such manner that the imaging is moved in the Y-direction. In order to achieve a distortion-free imaging, it is necessary to rotate the lens O around its principal planes HH'.

For moving the lens O in the X-direction, the adjustment lever EH2 is turned. Therefore, the cable DS2 is shortened and the lever H is moved around the axle AC while being supported on the roller FR. Therefore, the rod S is pushed in the axial direction through the pipe R.

Motion of the lens O in the counter-direction ensues in the same manner by turning the adjustment levers EH1 and EH2 in the opposite direction, whereby the force for changing the position of the rod S is generated by means of the compression spring DF.

List of Reference Symbols:
O—Lens
S—Rod
R—Pipe
PL—plate
H—Lever
AC—rotational axis
W—shaft
E—eccentric roller
F1—spring force
F2—spring force
DE—compression spring
FR—roller
UR—deflection roller
DS1, DS2—cables
RO1—roller
RO2—roller
EM—adjustment mechanism
EH1—Adjustment lever
HO1—hollow axle
AH—axle
RS1, RS2—friction spring disc
PL2—plate
VK—casing
SR—screw
BE—disc
SK—scale
XY—adjustment directions in the image plane
HH'—principal planes Although various minor modifications may be suggested by those versed in the art, it should be understood that I wish to embody within the scope of the patent warranted hereon, all such embodiments as reasonably and properly come within the scope of my contribution to the art.

I claim as my invention:

1. A device for adjusting the position of a lens in two directions, comprising: a lens fastened to one end of a rod; the rod being adjustably and rotatably seated in a pipe securely arranged to a plate of a housing; a lever pivotably connected at the other end of the rod; and means connecting to the lever for moving the lever such that the rod is moved in an axial direction and in a rotary direction.

2. A device according to claim 1 wherein a fixed support comprising a roller connected to the plate and positioned to abut against one end of the lever when the rod is moved in an axial direction.

3. A device according to claim 1 wherein a compression spring is arranged between the plate and the lever.

4. A device according to claim 1 wherein said means comprises a rotatable shaft on which an eccentric roller is arranged, an end of the lever abutting against said eccentric roller.

5. A device according to claim 4 wherein a cable is attached to the shaft, said cable further connecting to a first roller operable by a first adjustment lever.

6. A device according to claim 5 in which a second cable is connected to a second roller operable by a second adjustment lever, said second cable being secured to the other end of the lever.

7. A device according to claim 6 wherein one of the first and second rollers is arranged on a hollow axle and the other of the first and second rollers is secured to an axle arranged within the hollow axle.

8. A device according to claim 6 wherein the adjustment levers are designed as indicators adjacent a scale.

9. A device according to claim 1 wherein the lever rotates the lens about a rotational axis of the rod.

10. A non-mechanical printing device lens positioning system, comprising: a lens fastened to one end of a rod; a lever pivotably connected in a direction of the other end of the rod; means for rotatably and axially slidably mounting the rod; abutment means against which one part of the lever abuts; spring means acting on said lever to cause it to abut against said abutment means; first adjustment means for causing said lever to pivot and axially displace the rod; and second adjustment means for moving an end of the lever so as to rotate the rod.

11. The system of claim 10 wherein the abutment means abuts against one end of the lever, the first adjustment means comprises a cable attached to the other end of the lever, and the second adjustment means comprises a deflecting means for deflecting said other end of the lever.

* * * * *